Feb. 5, 1952 E. W. WORK 2,584,523
PRESSURE RELIEF VALVE
Filed March 28, 1949 3 Sheets-Sheet 2

INVENTOR.
ERICH W. WORK
BY
H. G. Manning
ATTORNEY

Feb. 5, 1952 E. W. WORK 2,584,523
PRESSURE RELIEF VALVE
Filed March 28, 1949 3 Sheets-Sheet 3
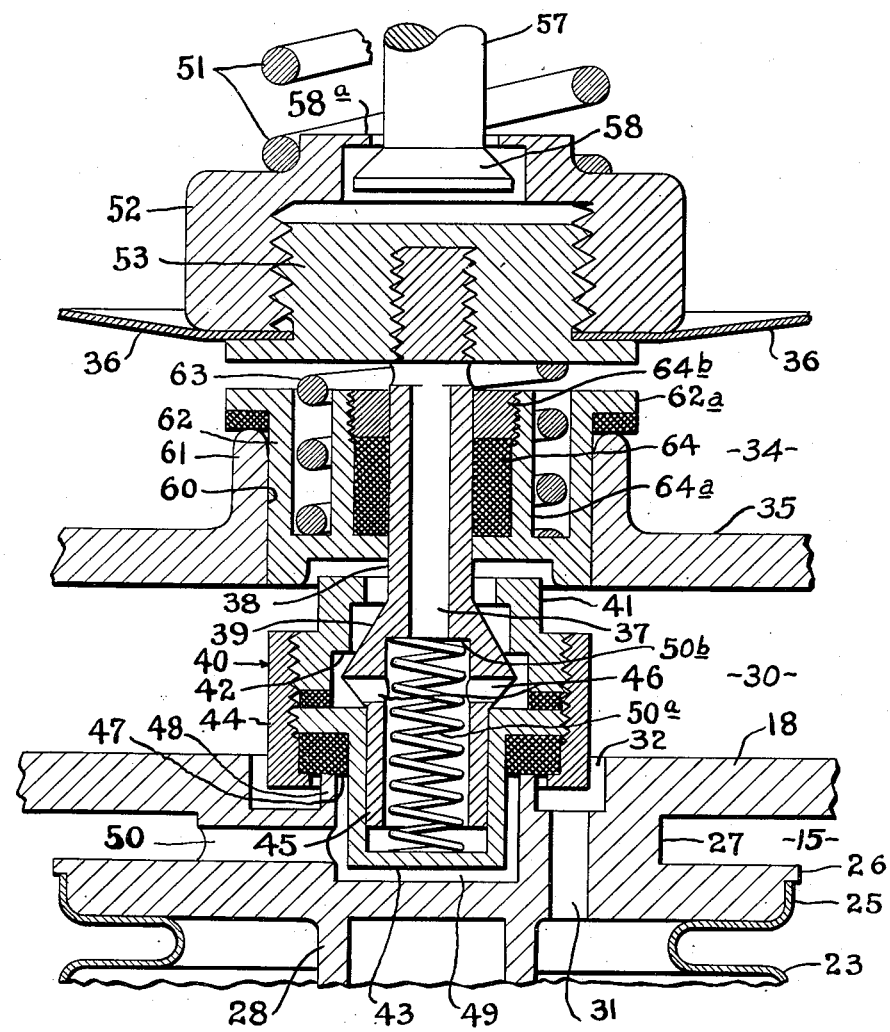
INVENTOR.
ERICH W. WORK
BY
H. G. Manning
ATTORNEY Patented Feb. 5, 1952

2,584,523

UNITED STATES PATENT OFFICE 2,584,523

PRESSURE RELIEF VALVE

Erich W. Work, Hartford, Conn., assignor to The Beaton & Cadwell Mfg. Co., Inc., New Britain, Conn., a corporation of Connecticut Application March 28, 1949, Serial No. 83,942

8 Claims. (Cl. 137—53)

This invention relates to valves for automatically relieving excessive pressure in fluid pressure systems, and more particularly to a relief valve of the type which comprises an auxiliary discharge valve for controlling the operation of a high capacity main valve.

One object of this invention is to provide a device of the above nature which will not only have a high discharge capacity, but will also operate within a narrow range of pressure variation, whereby the predetermined point of relief need not be advanced, and the pressure drop resulting from the operation of the valve will not be excessive.

Another object is to provide a relief valve of the above nature in which no continued discharge of fluid through the auxiliary discharge valve can occur under any conditions, thus avoiding wastage of fluid, noisy operation, wire-drawing, and other undesirable effects.

Another object is to provide a relief valve of the above nature in which both the opening and closing movements of the main valve will be prompt and complete, thus also preventing any waste of fluid and undue wear that would result from a continued intermediate position of the main valve due to borderline pressure conditions or other causes.

A further object is to provide a relief valve of the above nature which will be simple in construction, inexpensive to manufacture, easy to install and maintain, compact, and very efficient and durable in use.

With these and other objects in view, there has been illustrated on the accompanying drawing one form in which the invention may conveniently be embodied in practice.

The relief valve disclosed embodies certain improvements over the relief valve which forms the subject of my Pat. No. 2,553,347, entitled "Pressure, Temperature, and Vacuum Relief Valves."

In the drawings,

Fig. 5 is a view of a portion of Fig. 1, showing the channel valve and discharge valve mechanism on an enlarged scale.

Figure 1:
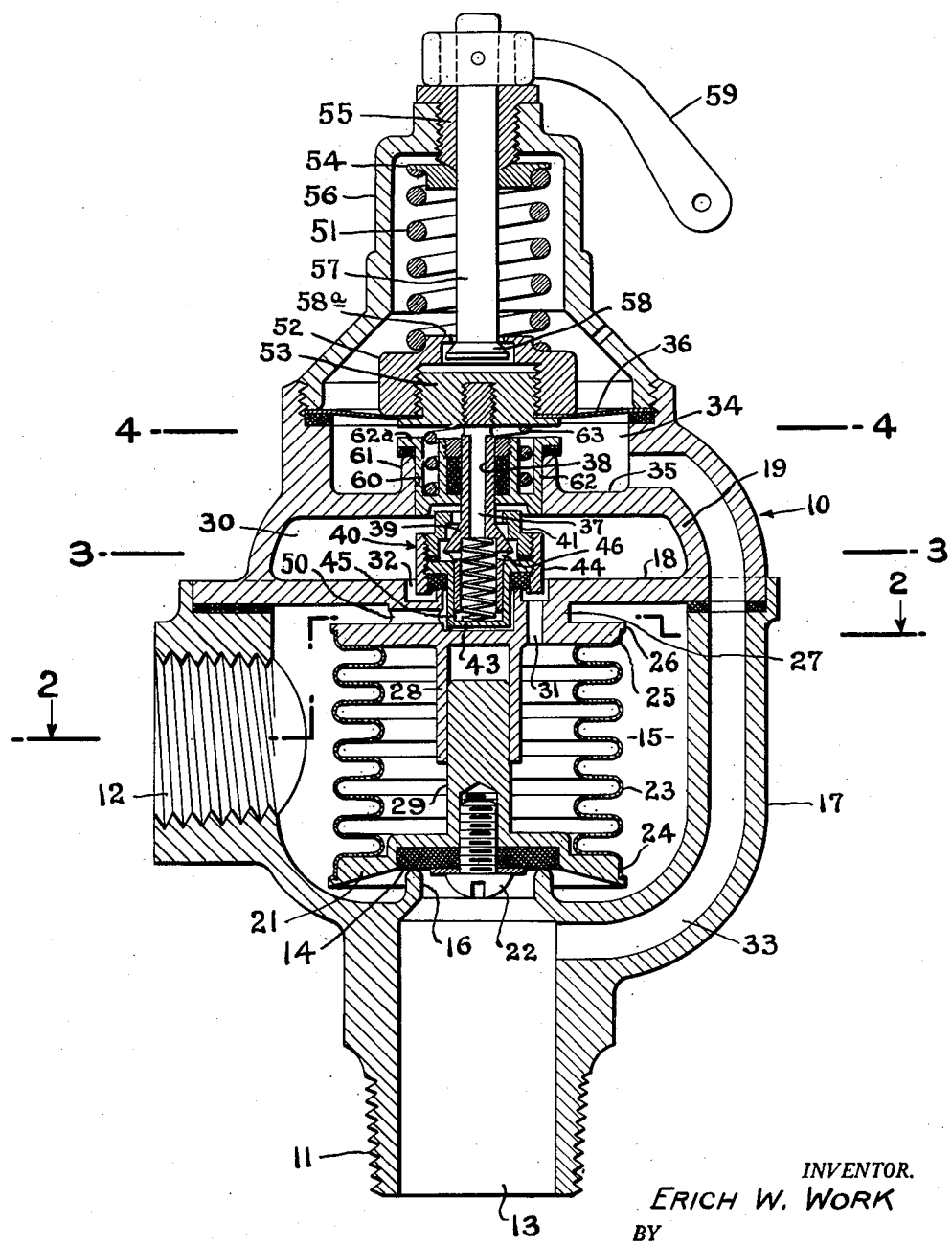
Fig. 1 is a longitudinal sectional view of the improved pressure relief valve.
Figure 2:
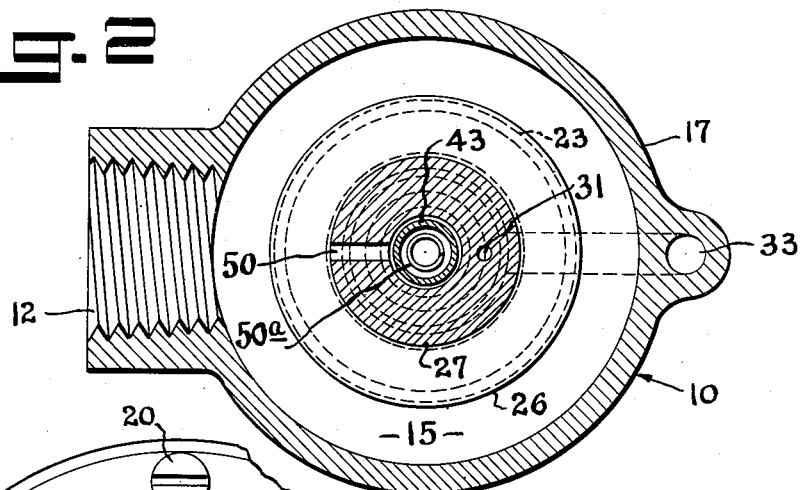
Fig. 2 is a cross sectional view, taken on the line 2—2 of Fig. 1, showing the outlet channel of the pressure chamber.

Referring now to the drawings, in which like reference numerals denote corresponding parts throughout the several views, the numeral 10 indicates generally a valve housing having a lower end in the form of a threaded inlet nipple 11, which is adapted for connection to a fluid pressure system (not shown).

The housing 10 is also provided with an internally threaded drain outlet 12 at one side, which is adapted for connection to any suitable pipe (not shown) for carrying away the fluid discharged by the relief valve to a suitable point of disposal.

While the fluid is being discharged through the relief valve, the principal path of the flow will be upwardly through a vertical channel 13 in the nipple 11, past a main valve disk 14, which will then be wide open, through a main chamber 15, and out through the drain outlet 12. The main valve disk 14, however, normally engages against and closes a circular main valve seat which is provided by an upstanding round-edged cylindrical flange 16 at the upper end of the vertical inlet channel 13.

Figure 3:
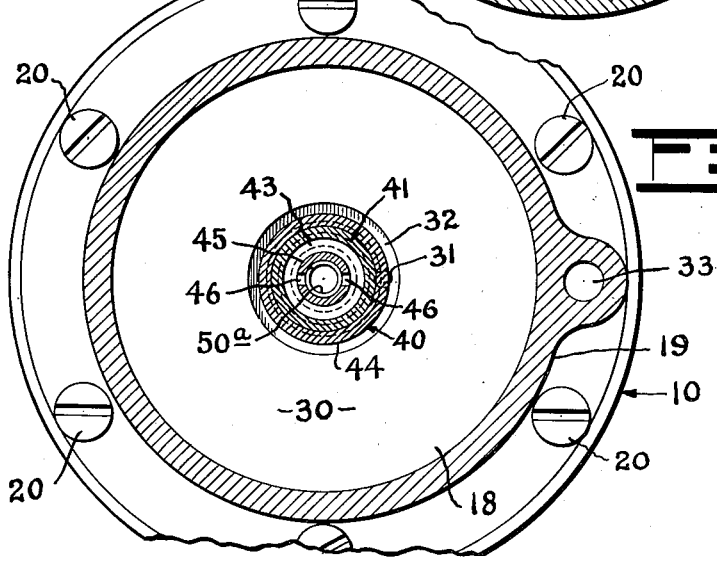
Fig. 3 is a cross sectional view, taken on the line 3—3 of Fig. 1, showing the interior of the channel valve case and the pressure chamber.
Figure 4:
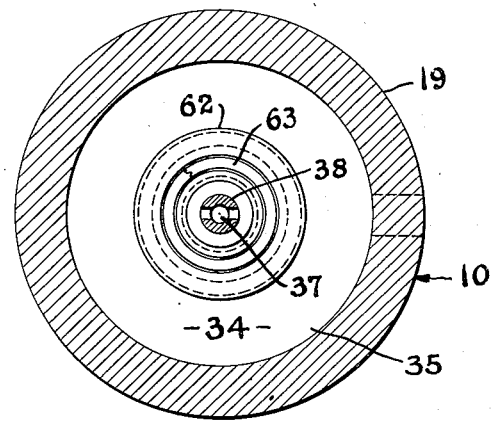
Fig. 4 is a cross sectional view, taken on the line 4—4 of Fig. 1, showing the interior of the upper chamber.

The main chamber 15 is formed as a cavity in the upper end of a lower housing section 17, and is closed at the top by means of an integral lower wall 18 of an upper housing section 19 which is secured to said lower housing section by any suitable means such as screws 20 (Fig. 3).

The main valve disk 14 is secured to the lower side of a recessed backing member 21 by means of a central screw 22, and is adapted to be pressed against the main valve seat 16 by fluid pressures which act against the upper face of said backing member, and which are laterally confined by means of a generally cylindrical corrugated flexible bellows 23.

The bellows 23 is provided with circular end rims 24, 25 which are soldered respectively to the periphery of the recessed backing member 21, and to the periphery of an upper end disk 26 which is integrally attached to the lower central portion of the wall 18 by means of an intermediate neck 27.

Inasmuch as the bellows 23 is flexible, the backing member 21 and the end disk 26 are provided with telescoping sleeve and rod elements 28, 29, within said bellows in order to guide the vertical movements of the main valve disk 14 and maintain said valve disk in alignment with the valve seat 16.

The end disk 26 and the neck 27 are provided with a vertical aperture 31 which opens into an annular central recess 32 in the upper surface of the wall 18, whereby open communication will be maintained between the interior of the bellows 23 and a pressure chamber 30 which is formed in the upper housing section 19 immediately above the transverse wall 18.

In order to permit fluid communication between the pressure chamber 30 and the inlet channel 13, the housing 10 is formed with a conduit 33 extending from the inlet channel 13 to an upper chamber 34 which is separated from the pressure chamber 30 by means of an integral transverse wall 35, and which has a movable upper wall in the form of a centrally apertured flexible diaphragm 36.

The upper chamber 34 is adapted to communicate with the pressure chamber 30 through a T-shaped channel 37 formed in a vertically-slidable hollow valve stem 38 which is attached to the flexible diaphragm 36 at its upper end. The lower end portion of the stem 38 is enlarged so as to form a frusto-conical channel valve element 39, which is loosely contained in a channel valve case 40 movably disposed within the pressure chamber 30.

The valve case 40 comprises an upper flanged ring 41 having an inner circular seat 42 (Fig. 5) which is adapted to be engaged and closed by the frusto-conical channel valve element 39 when the valve stem 38 is moved upwardly. The case 40 further includes a flanged cup 43 which is secured to the lower side of the flanged ring 41 by means of a threaded ring 44 and which slidably receives an integral guide sleeve portion 45 on the lower end of the valve element 39.

A pair of lateral apertures 46 are formed at the lower end of the valve element 39 in order to provide fluid communication between the T-shaped channel 37 and the interior of the case 40, thus permitting the fluid to pass upwardly around the outside of the valve element 39 and the valve stem 38, and out of the valve case 40 into the pressure chamber 30, excepting at such times as the channel valve element 39 may be engaged with the circular seat 42 within said case.

It will thus be seen that the valve element 39 and the valve case 40 constitute a channel valve means which is operable by vertical movement of the valve stem 38 to control communication between the upper chamber 34 and the pressure chamber 30.

The valve case 40 is also provided with a downwardly facing annular discharge valve 47 which is confined between the outer surface of the flanged cup 43 and a downwardly-extending end portion of the threaded ring 44, and which is adapted to engage a discharge valve seat in the form of a circular flange 48 at the inner edge of the annular recess 42 in the wall 18.

The circular flange 48 embraces a cylindrical recess 49 which extends downwardly into the neck 27 so as to accommodate the cup 43 when the channel valve case 40 is in its lowermost position.

The annular recess 32 has a substantially greater diameter than the channel valve case 40, while the recess 49 is considerably wider than the cup 43, so that when the valve case 40 is raised to separate the discharge valve 47 from the circular flange 48, fluid may pass freely from the pressure chamber 30 into the main chamber 15 through an outlet channel 50 which extends laterally through one side of the neck 27.

However, the discharge valve 47 will normally be pressed downwardly against the discharge valve seat 48 by the action of fluid pressure within the channel valve case 40 so as to prevent the release of any fluid from the presure chamber 30, this action being supplemented by a small coil spring 50a which is engaged between the bottom of the cup 43 and an annular shoulder 50b in the interior of the valve element 39.

Moreover, inasmuch as the conical valve element 39 is normally disposed below and out of engagement with the inner seat 42 of the valve case 40, said valve element 39 and said valve case 40 constitute a lost-motion connection between the valve stem 38 and the discharge valve 47. Thus, the discharge valve 47 will remain closed during an initial upward movement of the stem 38, and can open only during an upward movement of the stem 38 which is continued after the frusto-conical channel valve element 39 has fully engaged the inner seat 42 and has closed communication between the upper chamber 34 and the pressure chamber 30.

In order to hold the channel valve element 39 normally disengaged from the inner seat 42, the valve stem 38 is pressed downwardly by means of a relatively strong coil spring 51 seated upon a threaded central ring member 52 which is clamped to the upper side of the flexible diaphragm 36 by means of a lower flanged plug 53, the latter also having the threaded upper end of the valve stem 38 secured therein. The upper end of the coil spring 51 is engaged with a base washer 54 (Fig. 1) which is held by a screw bushing 55 adjustably supported in the upper end of a spring housing 56. The lower end of the spring housing 56 is secured by screw threads to the upper end of the housing section 19, and serves to clamp and seal the periphery of the flexible diaphragm 36 in place.

Thus, the force provided by the spring 51 may be adjusted by means of the screw bushing 55 in order to regulate the point at which the diaphragm 36 will respond to fluid pressure in the upper chamber 34 so as to raise the valve stem 38.

It will be noted that the coil spring 51 will normally hold the channel valve element 39 against the top of the flanged cup 43, thus positively holding the discharge valve 47 closed, although the spring 51 is not relied upon for this function in view of the spring 50a and the effects of pressure within the cup 43, as described above.

In order to permit the relief valve to be opened manually, provision is made of a slidable vertical stem 57 which is guided in the screw bushing 55 and has an enlarged conical lower end 58 loosely engaged beneath an inwardly-extending integral flange 53a on the threaded ring member 52. The upper end of the stem 57 is provided with a pivotal testing lever 59 which will permit manual operation of said stem.

As a means for facilitating the assembly, inspection, and repair of the relief valve, the transverse bottom wall 35 of the upper chamber 34 is provided with an enlarged central aperture 60, which is of sufficient size to permit the channel valve case 40 to be withdrawn upwardly therethrough.

The enlarged aperture 60 is provided with an upstanding cylindrical rim 61, and has a cup-shaped closure 62 disposed therein. The upper end of the closure 62 has an outer flange 62a which is held seated upon a packing on said rim 61 by means of a coil spring 63 engaged between the bottom of said closure 62 and the lower surface of the plug 53.

The closure 62 is also provided with an inner receptacle 64a having a threaded ring 64b for retaining a packing 64 which slidably embraces the valve stem 38, so as to prevent leakage of fluid around said stem from the upper chamber 34 into the pressure chamber 30.

Thus, it will be seen that all of the valve mechanism which is disposed in the upper housing section 19 may be easily removed merely by unscrewing the spring housing 56 from said upper housing section so as to permit withdrawal of the diaphragm 36, the flanged closure 62, and the channel valve case 40.

*Operation*

To install the improved relief valve, the inlet nipple 11 will first be connected to a pressure system and the drain outlet 12 connected to any suitable drain pipe.

It will be understood that as long as the fluid pressure in the inlet channel 13 does not exceed the predetermined point of relief, as determined by the adjustment of the screw bushing 55, all of the parts will remain in the positions shown in Figs. 1 and 5.

The pressure in the inlet channel 13, will, of course, be communicated through the conduit 33, the upper chamber 34, the T-shaped channel 37, the interior of the channel valve case 40, the pressure chamber 30, and the interior of the bellows 23, so that the downward pressure against the backing member 21 will be equalized with the pressure in the inlet channel 13. Inasmuch as the upper surface of the main valve backing member 21 has a greater effective area than the lower surface of the main valve 14, the main valve will be held firmly closed against the seat 16.

Assuming now that the fluid pressure in the inlet channel 13 should rise and approach the predetermined point of relief, the corresponding pressure rise in the upper chamber 34 will be exerted against the flexible diaphragm 36 so as to overcome the force of the strong coiled spring 51 and initiate an upward movement of the valve stem 38 and the frusto-conical channel valve element 39.

Although the fluid pressure in the upper chamber 34, the pressure chamber 30, and the interior of the bellows 23 will have been equalized up to this point, the channel valve element 39 will now engage the circular seat 42, thus cutting off the pressure chamber 30 and the interior of the bellows 23 from any further supply of fluid from the upper chamber 34, and preventing any further pressure rise therein.

It will be understood that the discharge valve 47 will continue to be held tightly against the circular flange 48 during this initial upward movement of the stem 38 not only because of the force of the coil spring 50a, but also because of the fluid pressure which exists within the channel valve case 40 and which is exerted downwardly upon the interior of the flanged cup 43.

Inasmuch as the frusto-conical channel valve element 39 is now in engagement with the inner circular seat 42, a further pressure rise in the upper chamber 34 will be accompanied not only by a further upward movement of the channel valve element 39, but will also cause the entire channel valve case 40 to rise and thus separate the annular discharge valve 47 from the circular flange 48. The fluid pressure in the pressure chamber 30 will then be completely discharged through the recess 49, the outlet channel 50, and the drain opening 12, thus releasing the pressure within the bellows 23 and permitting a rapid and complete opening of the main valve disk 14.

It will be understood that the flexible diaphragm 36 will maintain the channel valve element 39 and the channel valve case 40 in a raised position during the entire time that any excessive pressure remains in the inlet channel 13.

During this time the coil spring 50a and the fluid pressure within the cup 43 will hold the frusto-conical valve element 39 in firm engagement with the inner circular seat 42, thus preventing any fluid from entering the pressure chamber 30 and preventing any pressure rise therein.

The fluid in the inlet channel 13 will continue to be discharged at a high rate past the main valve disk 14 until such time as nearly all of the excess pressure is relieved and the pressure in said channel approaches a predetermined normal value. The pressure in the upper chamber 34 will undergo a corresponding drop, being equalized with the inlet pressure through the conduit 33, until the force of the coiled spring 51 is sufficient to overcome the upward pressure on the flexible diaphragm 36.

The diaphragm 36 will then start to descend, carrying with it the valve stem 38, the channel valve element 39, and the channel valve case 40, while the inner circular seat 42 remains in engagement with the channel valve element 39. When the discharge valve 47 has become seated upon the circular flange 48, the descent of the valve case 40 will be stopped and the pressure chamber 30 will be closed off from the outlet channel 50.

At this point in the operation the main valve 14 will still be wide open. If the pressure in the inlet channel 13 should now drop to the predetermined normal value, further downward movement of the diaphragm 36 will cause the channel valve element 39 to become separated from the inner circular seat 42, whereupon the fluid under pressure in the upper chamber 34 may again enter the pressure chamber 30 and the bellows 23, so as to close the main valve disk 14 firmly against the flange 16.

One advantage of the improved relief valve is that no continuous discharge of fluid past the auxiliary discharge valve can occur inasmuch as the pressure chamber 30 can never be in simultaneous communication with both the inlet and outlet of the relief valve. It will thus be seen that the main valve will never be held in a partially open position, but will always be either fully open, or fully closed, except during the actual opening and closing movements of the valve.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a relief valve having an inlet, an outlet, and a pressure chamber; mechanism for controlling pressure in said chamber comprising a valve means for admitting fluid from said inlet to said pressure chamber, a spring-pressed movable wall exposed to the pressure of fluid in said inlet, said movable wall being connected to said valve means and being movable in response to a predetermined pressure rise in said inlet fluid to completely close said valve means, a discharge valve for releasing fluid from said pressure chamber, a lost-motion connection between said movable wall and said discharge valve responsive to a further rise in said inlet pressure for opening said discharge valve, and means for continuously holding said valve means closed while said discharge valve is open, whereby a continuous discharge of fluid from said inlet through said pressure chamber to said outlet will be prevented.

2. In a relief valve having a housing containing a main valve, means in said housing for controlling said main valve, comprising a pressure chamber, an upper chamber divided from said pressure chamber by a transverse wall of said housing, and valve mechanism in said pressure chamber having a slidable stem extending upwardly through said transverse wall, said transverse wall being provided with an aperture of greater transverse dimensions than said valve mechanism, said aperture being closed by a cup seated upon said transverse wall and slidably receiving said stem, whereby fluid pressure in said upper chamber which predominates over pressure in said pressure chamber will hold said cup seated on said transverse wall, and said valve mechanism may be removed through said aperture.

3. In a relief valve having a pressure chamber and a main valve controlled by the pressure of fluid in said pressure chamber; means for selectively admitting fluid to said chamber or releasing fluid therefrom, comprising a valve stem extending slidably through a wall of said pressure chamber, and having an enlarged integral channel valve element disposed in said chamber, a movable valve case loosely enclosing said valve element and having an inner valve seat adapted to engage said valve element adjacent said stem, the interior of said valve case being open to said pressure chamber outwardly of said valve seat, said valve stem and said valve element being provided with a longitudinal channel open at its outer end to a source of fluid and at its inner end to the interior of said valve case, a wall of said pressure chamber opposite said first mentioned wall being provided with an outlet channel having a discharge valve seat aligned with said valve case, a discharge valve carried by said valve case and adapted to engage said discharge valve seat, and means for sliding said valve stem to operate said valve element and said discharge valve.

4. The invention as defined in claim 3, in which said valve case is provided with an inner bottom surface exposed to fluid pressure in the channel in said stem, whereby said inner circular seat may be held against said enlarged valve element when said discharge valve is separated from its seat.

5. The invention as defined in claim 3, in which said first-mentioned pressure chamber wall has an aperture of a diameter greater than the diameter of said valve case, said aperture having a closure in which said stem is slidably disposed, whereby removal of said valve case from the pressure chamber for purposes of inspection and repair will be facilitated.

6. In a pilot valve mechanism for controlling fluid pressure in a chamber of a relief valve, a valve means for admitting fluid to said chamber, pressure responsive means for closing said valve means, a discharge valve for releasing fluid from said chamber, a lost-motion connection between said pressure responsive means and said discharge valve for opening said discharge valve upon an increase of fluid pressure occurring after said valve means is closed, and means for continuously holding said valve means closed while said discharge valve is open.

7. The invention as defined in claim 6, in which said discharge valve is located within said chamber and is adapted to engage a seat in a wall of said chamber, said discharge valve having an area effectively exposed in a direction opposite from said seat whereby fluid pressure in said chamber will tend to hold said discharge valve seated.

8. In a pilot valve mechanism for controlling fluid pressure in a chamber of a relief valve, a discharge valve in said chamber adapted to engage a seat in a wall of said chamber for controlling the release of fluid therefrom, said discharge valve being provided with an area effectively exposed in a direction opposite from said seat whereby fluid pressure in said chamber will tend to hold said discharge valve seated, valve means for controlling the admission of fluid to said chamber, means for operating said valve means, and a lost-motion connection between said operating means and said discharge valve for drawing said discharge valve away from said seat after closing of said valve means.

ERICH W. WORK.

REFERENCES CITED

The following references are of record in the file of this patent:

UNITED STATES PATENTS

| Number | Name | Date |
|---|---|---|
| 191,078 | Scovell | May 22, 1877 |
| 534,514 | Mellin | Feb. 19, 1895 |
| 845,058 | Dake | Feb. 26, 1907 |
| 868,030 | Tanner | Oct. 15, 1907 |
| 2,074,292 | Wilkins | Mar. 16, 1937 |
| 2,214,963 | Jurs | Sept. 17, 1940 |
| 2,225,916 | Maglott | Dec. 24, 1940 |
| 2,279,571 | Kane | Apr. 14, 1942 |
| 2,375,410 | Gondek | May 8, 1945 |